United States Patent
Eizikovich

(10) Patent No.: US 8,595,298 B2
(45) Date of Patent: Nov. 26, 2013

(54) COMMUNICATION SYSTEMS, METHODS, AND COMPUTER PROGRAM PRODUCTS FOR EFFICIENT PEER-TO-PEER TRANSMISSION

(75) Inventor: Arik Eizikovich, Rishon Le-zion (IL)

(73) Assignee: Allot Communications Inc., Woburn, MA (US)

( * ) Notice: Subject to any disclaimer, the term of this patent is extended or adjusted under 35 U.S.C. 154(b) by 267 days.

(21) Appl. No.: 12/938,391

(22) Filed: Nov. 3, 2010

(65) Prior Publication Data

US 2011/0119334 A1    May 19, 2011

Related U.S. Application Data

(60) Provisional application No. 61/259,220, filed on Nov. 9, 2009.

(51) Int. Cl.
*G06F 15/16* (2006.01)
*G06F 15/173* (2006.01)

(52) U.S. Cl.
USPC .......... 709/204; 709/219; 709/203; 709/229; 709/205; 709/217; 709/223; 713/168

(58) Field of Classification Search
USPC .................. 709/223, 219, 217, 231
See application file for complete search history.

(56) References Cited

U.S. PATENT DOCUMENTS

| | | | |
|---|---|---|---|
| 2006/0212542 A1* | 9/2006 | Fang et al. ............. | 709/219 |
| 2006/0230111 A1* | 10/2006 | Andersen et al. ........ | 709/205 |
| 2007/0174471 A1* | 7/2007 | Van Rossum ........... | 709/229 |
| 2007/0245010 A1* | 10/2007 | Arn et al. .............. | 709/223 |
| 2008/0228869 A1* | 9/2008 | Kraft et al. ............ | 709/203 |
| 2011/0099372 A1* | 4/2011 | Annapureddy et al. ... | 713/168 |

* cited by examiner

*Primary Examiner* — Jude Jean Gilles
(74) *Attorney, Agent, or Firm* — Oren Reches

(57) ABSTRACT

A system, computer readable medium and a method for caching, the method may include: determining to cache at least a certain data file piece of a data file; identifying at least one participating peer; requesting from the at least one participating peer, at least one of (i) a data file piece number of at least one data file piece that belongs to the data file; (ii) at least a segment of at least one data file piece; calculating an evaluated certain file piece size and a file pieces number estimation based on at least one response of at least one participating peer; and caching the certain data file piece in a cache module, in response to the evaluated certain data file piece size.

20 Claims, 4 Drawing Sheets

COMMUNICATION SYSTEMS, METHODS, AND COMPUTER PROGRAM PRODUCTS FOR EFFICIENT PEER-TO-PEER TRANSMISSION

RELATED APPLICATIONS

This application claims priority from U.S. provisional patent Ser. No. 61/259,220 having a filing date of Nov. 9, 2009 which is incorporated herein by reference.

FIELD OF THE INVENTION

This application related to systems, methods and non-transient computer readable mediums for caching content transmitted over peer to peer connections.

BACKGROUND OF THE INVENTION

In Peer-to-Peer (P2P) systems, files are shared between multiple users, wherein each user (known as peer) may receive different parts of a single file from various peers, wherein some or all of those peers may not have the entire files, but only different portions of which. One such Peer-to-Peer protocol that is in wide use is the Bit-Torrent protocol (hereinbelow also denoted "BT"). It is however noted that the invention may be implemented for other types of Peer-to-Peer communication as well.

In many P2P networks, files are distributed as a number of identically sized pieces (besides, potentially, the last piece). Such pieces may be of different sizes in different implementations, e.g. between 64 KB and 4 MB each. According to various P2P networks, a checksum (or other identifier string, or error correction string) is created for each of those pieces—usually by the first distributer of the file. For example, according to the Bit-Torrent protocol, a checksum is created for each piece using the SHA1 hashing algorithm.

The identifiers of all of the pieces may be stored in a single file, which is used by different users to successfully download the file, and to validate the correctness of the download (by comparing the checksum of the received pieces to those stored in the file). It is noted that such a file (which in the BT protocol implementation is commonly known as "torrent file").

Such file which stores the identifiers of the different pieces may further include additional information, according to different protocols. For example, it may include some or all of the following portions—a link (e.g. a URL) to a tracking server that maintains lists of the client currently participating in a P2P transfer of a file (e.g. a BT tracker), suggested names for one or more files that are contained within the file, their lengths, number of pieces, the piece length used, total size, and a SHA-1 hash code (or other identifier) for each piece. All of this information may be used by a receiving client to verify an integrity of data received.

The different peers may find such an information file in different ways (e.g. browsing the web), connect to a tracking server that is identified within this information file (e.g. by a dedicated client software) and receiving from the tracking server a list of peers currently transferring pieces of one or more files specified in the information file. In order to download the actual payload file, the peer client may than connect to any one or more of those peers to obtain the various pieces. It is noted that in different P2P networks, different mechanisms may be implemented for improving download and upload rates. One such mechanism is downloading pieces of a file in a random order, so as to increase the opportunity to exchange data, which is only possible if two peers have different pieces of the file.

Private tracking servers are known in the art, which restrict access to identified users (e.g. requiring registration by a user account). A common method for controlling registration is an invitation system, in which highly regarded peers may invite several new users to register at the site. Other tracker servers may be semi-private tracker servers, in which some of the files may be downloaded by non-members. It is noted that a torrent file can include a private flag that may indicate whether a data file is to be access restricted or not.

Also, some P2P transmission may be encoded—wherein not only the payload information may be encoded, but also the information file that contains information of the different pieces of the files transmitted.

Other policies implemented by peers or by servers include limiting the transmission of file pieces only to peers that qualify different criteria—e.g. a tit for tat scheme. However, as strict policies may hamper overall transmission, different P2P networks may implement different "release" mechanisms, in which peers may be encouraged or forced to share at least some information with peers that do not qualify for the criteria used.

FIG. 1 illustrates a data file 10 (also referred to as payload file) and an information file 20, according to a prior art implementation. It is noted that the hashing process may be replaces by other algorithms known in the art (e.g. various ECCs known in the art). The data file 10 includes multiple (k) data file pieces 12(1)-12(k). Each data file piece can include multiple segments (blocks). Each data file piece can be transmitted independently from other data file pieces. Usually, in peer to peer transmission, a data file piece is transmitted one data piece segment after the other.

The information file 20 includes a header 22, a file descriptor 26 and multiple (k) data file piece identifiers 24(1)-24(k). A data file piece identifiers can be calculated by applying a hash function on data file piece. The file descriptor 26 can be calculated by applying a hash function on all data file pieces.

SUMMARY

According to various embodiments of the invention a method for caching is provided. The method may include determining to cache at least a certain data file piece of a data file, the data file comprises multiple data file pieces; wherein each data file piece has a unique data file piece number that is indicative of an order of the data file piece in the data file; wherein an information file stores data file piece numbers of all the multiple data file pieces; identifying at least one participating peer that either (i) participates in an actual peer to peer transfer of a data file piece that belongs to the data file, and (ii) is expected to participate in an expected peer to peer transfer of a data file piece that belongs to the data file; requesting from the at least one participating peer, at least one of (i) a data file piece number of at least one data file piece that belongs to the data file and is associated with an actual or expected peer to peer transfer; (ii) at least a segment of at least one data file piece that is associated with an actual or expected peer to peer transfer; calculating an evaluated certain file piece size and a file pieces number estimation based on at least one response of at least one participating peer; and caching the certain data file piece in a cache module, wherein the caching may be responsive the evaluated certain data file piece size.

The method may include sending to a requesting peer an indicator about at least one data file piece that is cached in the cache module; wherein the indicator is generated in response to the file pieces number estimation. The indicator can be a data structure that has multiple fields, each field relates to a data file piece and the number of fields can equal the file pieces number estimations. For example the indicator can be a bit map in which the value of each bit indicates whether a certain data file piece is cached or not. The requesting peer may expect to receive an indicator that has a predefined number of fields (equal the actual file pieces number) and may reject an indicator that has a different number of fields.

The method may include calculating the evaluated certain file piece size and the file pieces number estimation, without using the information file.

The method may include requesting from multiple participating peers data file piece numbers; receiving a plurality of data file piece numbers; finding a highest value data file piece number of the plurality of data file piece numbers; and setting the file pieces number estimation as the highest value data file piece number.

The method may include caching the certain data file piece and at least one additional data file piece that belongs to the data file.

The method may include detecting a transmission of the information file or a transmission of at least one data file piece.

The method may include requesting from multiple participating peers segments of the certain data file piece and calculating the evaluated certain file piece size based on an amount of segments of the certain data file piece received from the multiple participating peers.

The method may include updating the evaluated certain file piece size and the file pieces number estimation based on information obtained as a result of a transfer of another file piece.

The method may include transmitting the certain data file piece.

The method may include receiving a request to transmit the certain data file piece to a peer from another peer; terminating a peer to peer connection between the peer and the other peer; retrieving the certain data file piece from the cache module; and transmitting the certain data file piece to the peer.

According to an embodiment of the invention a non-transient computer readable medium can be provided and may stores instructions for: determining to cache at least a certain data file piece of a data file, the data file comprises multiple data file pieces; wherein each data file piece has a unique data file piece number that is indicative of an order of the data file piece in the data file; wherein an information file stores data file piece numbers of all the multiple data file pieces; identifying at least one participating peer that either (i) participates in an actual peer to peer transfer of a data file piece that belongs to the data file, and (ii) is expected to participate in an expected peer to peer transfer of a data file piece that belongs to the data file; requesting from the at least one participating peer, at least one of (i) a data file piece number of at least one data file piece that belongs to the data file and is associated with an actual or expected peer to peer transfer; (ii) at least a segment of at least one data file piece that is associated with an actual or expected peer to peer transfer; calculating an evaluated certain file piece size and a file pieces number estimation based on at least one response of at least one participating peer; and caching the certain data file piece in a cache module, wherein the caching may be responsive to the evaluated certain data file piece size.

The non-transient computer readable medium may store instructions for sending to a requesting peer an indicator about at least one data file piece that is cached in the cache module; wherein the indicator is generated in response to the file pieces number estimation. The indicator can be a data structure that has multiple fields, each field relates to a data file piece and the number of fields can equal the file pieces number estimations. For example the indicator can be a bit map in which the value of each bit indicates whether a certain data file piece is cached or not. The requesting peer may expect to receive an indicator that has a predefined number of fields (equal the actual file pieces number) and may reject an indicator that has a different number of fields.

The non-transient computer readable medium may store instructions for calculating the evaluated certain file piece size and the file pieces number estimation, without using the information file.

The non-transient computer readable medium may store instructions for: requesting from multiple participating peers data file piece numbers; receiving a plurality of data file piece numbers; finding a highest value data file piece number of the plurality of data file piece numbers; and setting the file pieces number estimation as the highest value data file piece number.

The non-transient computer readable medium may store instructions for caching the certain data file piece and at least one additional data file piece that belongs to the data file.

The non-transient computer readable medium may store instructions for detecting a transmission of the information file or a transmission of at least one data file piece.

The non-transient computer readable medium may store instructions for requesting from multiple participating peers segments of the certain data file piece and calculating the evaluated certain file piece size based on an amount of segments of the certain data file piece received from the multiple participating peers.

The non-transient computer readable medium may store instructions for updating the evaluated certain file piece size and the file pieces number estimation based on information obtained as a result of a transfer of another file piece.

The non-transient computer readable medium may store instructions for transmitting the certain data file piece.

The non-transient computer readable medium may store instructions for receiving a request to transmit the certain data file piece to a peer from another peer; terminating a peer to peer connection between the peer and the other peer; retrieving the certain data file piece from the cache module; and transmitting the certain data file piece to the peer.

According to an embodiment of the invention a system is provided. The system may include a cache manager for determining to cache at least a certain data file piece of a data file, the data file comprises multiple data file pieces; wherein each data file piece has a unique data file piece number that is indicative of an order of the data file piece in the data file; wherein an information file stores data file piece numbers of all the multiple data file pieces; a participating peer identifier that may be arranged to identify at least one participating peer that either (i) participates in an actual peer to peer transfer of a data file piece that belongs to the data file, and (ii) is expected to participate in an expected peer to peer transfer of a data file piece that belongs to the data file; a peer information requesting module that may be arranged to request from the at least one participating peer, at least one of (i) a data file piece number of at least one data file piece that belongs to the data file and is associated with an actual or expected peer to peer transfer; (ii) at least a segment of at least one data file piece that is associated with an actual or expected peer to peer transfer; a calculator arranged to calculate an evaluated certain file piece size and a file pieces number estimation based on at least one response of at least one participating peer; and a cache module for caching the certain data file piece in a cache module, wherein the caching may be responsive to the evaluated certain data file piece size.

The system may be arranged to send to a requesting peer an indicator about at least one data file piece that is cached in the cache module; wherein the indicator is generated in response to the file pieces number estimation. The indicator can be a data structure that has multiple fields, each field relates to a data file piece and the number of fields can equal the file pieces number estimations. For example the indicator can be a bit map in which the value of each bit indicates whether a certain data file piece is cached or not. The requesting peer may expect to receive an indicator that has a predefined number of fields (equal the actual file pieces number) and may reject an indicator that has a different number of fields.

The calculator may be arranged to calculate the evaluated certain file piece size and the file pieces number estimation, without using the information file.

The peer information requesting module may be arranged to request from multiple participating peers data file piece numbers and to receive a plurality of data file piece numbers; wherein the calculator may be arranged to find a highest value data file piece number of the plurality of data file piece numbers; and to set the file pieces number estimation as the highest value data file piece number.

The cache manager may be arranged to cache the certain data file piece and at least one additional data file piece that belongs to the data file.

The system may include a communication module arranged to detect a transmission of the information file or a transmission of at least one data file piece.

The peer information requesting module may be arranged to request from multiple participating peers segments of the certain data file piece and calculating the evaluated certain file piece size based on an amount of segments of the certain data file piece received from the multiple participating peers.

The calculator may be arranged to updating the evaluated certain file piece size and the file pieces number estimation based on information obtained as a result of a transfer of another file piece.

The system may include a communication module for transmitting the certain data file piece.

The communication module may be arranged to receive a request to transmit the certain data file piece to a peer from another peer; terminate a peer to peer connection between the peer and the other peer; wherein the cache manager may be arranged to retrieve the certain data file piece from the cache module; and wherein the communication module is further arranged to transmit the certain data file piece to the peer.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
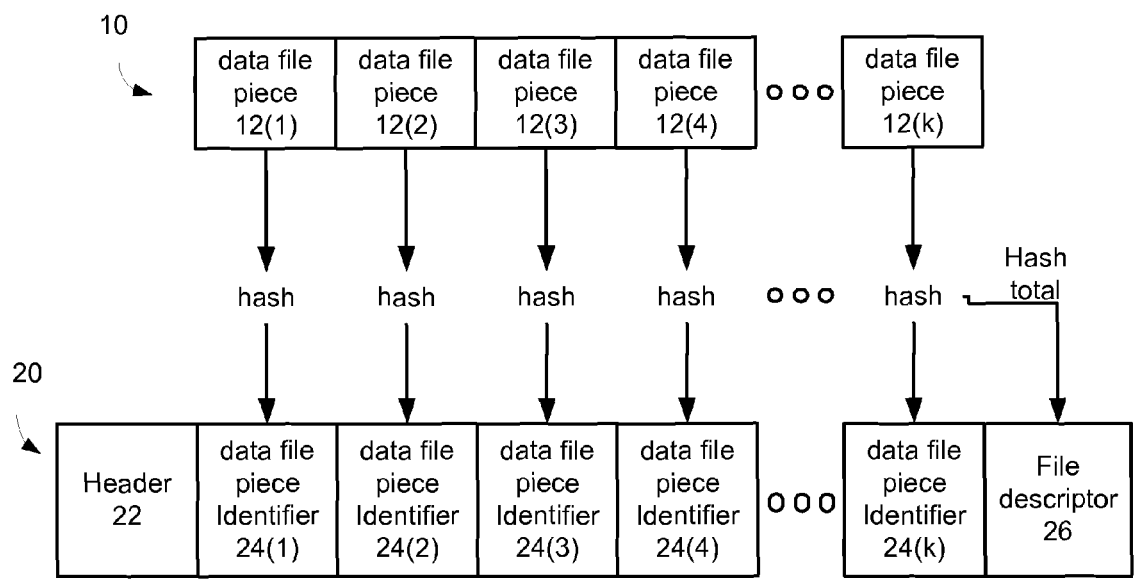
FIG. 1 illustrates a data file (also referred to as payload file) and an information file, according to a prior art implementation.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
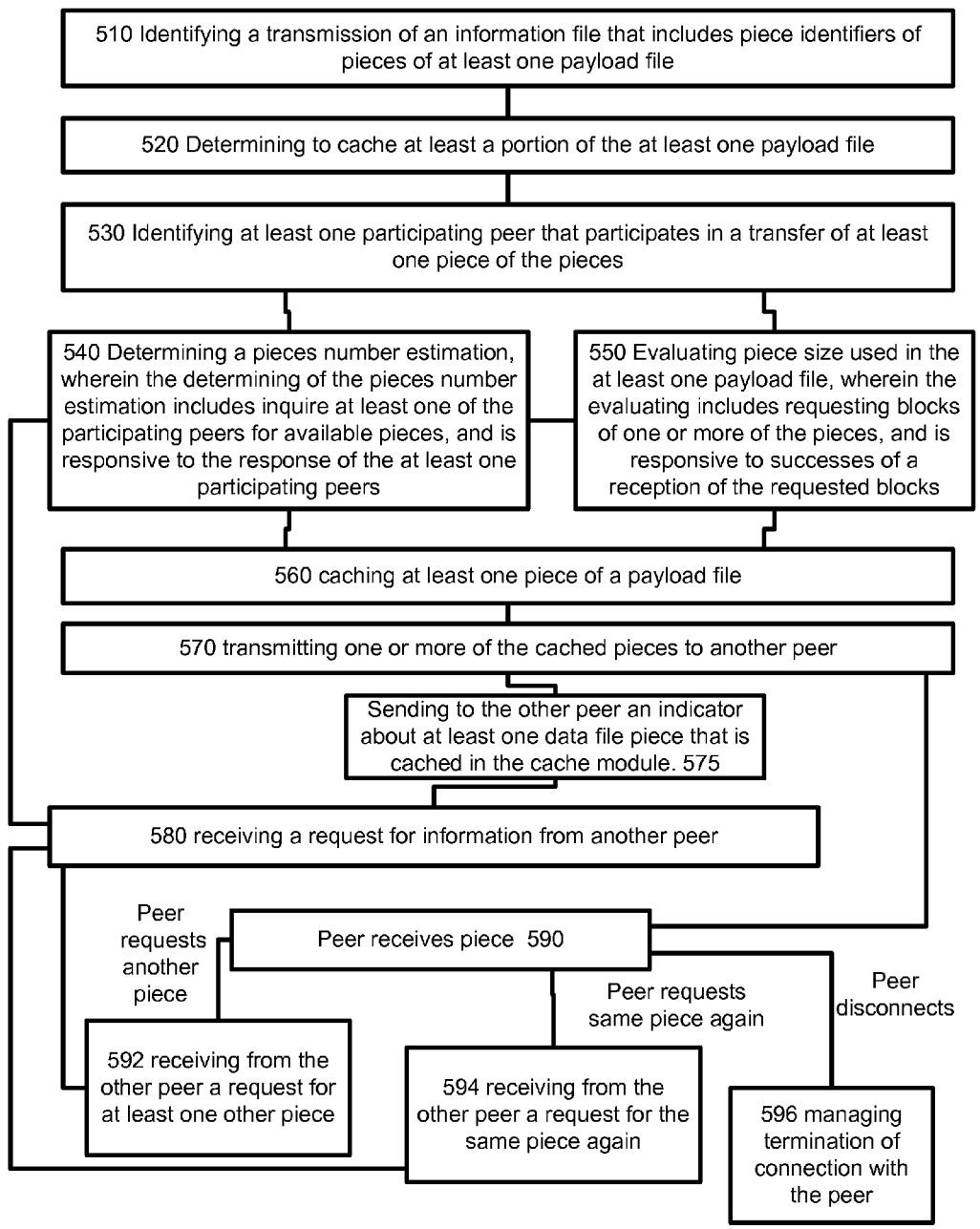
FIG. 2 illustrates a method for caching P2P transmitted information, according to an embodiment of the invention.

FIG. 2 illustrates method 500 for caching P2P transmitted information, according to an embodiment of the invention. It is noted that method 500 may be implemented in different P2P networks that implement various P2P protocols that may require an approval (by participating peers) that share a file whether they have different parts of the shared payload file.

It should be noted that method 500 may be implemented even if an information file—that stores indentifying information regarding the different parts of the payload file shared— is not available, not known, or encrypted. Even if such an information file is freely available, method 500 does not require it, and is thus also usable in situation in which acquiring of such file is not desirable.

Method 500 may be implemented, for example, by a dedicated peer manager, which manages communication between multiple peers. Method 500 may also be implemented, in another example, by a system operative as a peer within a P2P scheme, even if not authenticated by the other peers as eligible for sharing (e.g. if it can not receive the information file). It is noted that not necessarily all the stages illustrated in FIG. 2 are carried out in every implementation, and that other stages may be added, and/or may replace the exemplary illustrated stages.

It is further noted that while according to an embodiment of the invention all of the stages of method 500 may be carried automatically and autonomously (e.g. by such peer manager), according to other embodiments at least one of the stages (especially of determining) may be responsive, at least optionally, to human intervention, or to information received from external systems.

Method 500 may start with stage 510 of identifying a transmission of an information file that includes identifiers of pieces of at least one payload file. It is noted that the identification stage may alternatively (or in addition) include identifying transmission of the pieces themselves. Significantly, the identifying should facilitate, according to an embodiment of the invention, identifying that different transmissions pertain to a single sharing. Stage 510 can include detecting that a tracker searches for a hash value.

It should be noted that the identifying of the transmission of the information file does not necessarily mean that the transferred information file may be acquired, or that it may be deciphered. Method 500 does not require decoding of the information file for its operation, merely, if stage 510 is carried out, identifying a transmission that includes at least a portion of the information file. Usually, the transfer of the information file should be distinguishable from transmissions of other information files.

The information file can be a metadata file and can be, for example, a .torrent file.

The identifying may be followed by stage 520 of determining to cache at least a portion of the at least one payload file. The determining to cache may be responsive, for example, to popularity of the respective shared file (or files), to size of the respective shared file, to locations of one or more of the peers sharing the file, to bandwidth constrains, and so forth. Usually, caching of the shared file (or files) is determined upon, if providing of at least parts of the payload file from the cache instead from other peers would save on resources such as bandwidth, computational resources, and so forth. However, other considerations may apply.

Stage 530 of method 500 includes identifying at least one participating peer that participates in a transfer of at least one piece of the pieces. The identifying of the at least one participating usually entails detecting a source or a target of a communication which includes the information file. However, it is noted that the identifying of stage 530 may also be responsive to identifying in other ways (e.g. by detecting payload transmission, especially once at least a portion of the information file was reconstructed, by retrieving information from a tracking server, and so forth).

Stage 540 of method 500 includes determining a pieces number estimation (i.e. an estimation of the number of pieces which constructs the at least one payload file that is described by the information file), wherein the determining of the pieces number estimation includes inquiring at least one of the participating peers for available pieces, and may be responsive to the response of the at least one participating peers.

It is noted that usually, each participating peer is configured to send, upon inquiry, a data structure (e.g. a vector, a bit field), indicating for each of the pieces as a binary value if the corresponding piece is available for sharing by that participating field. It is however noted that non-binary values may also be used.

By way of example, a value of "1" in a third position of a bit field provided by a participating peer may indicate that a third piece can be downloaded from the participating peer, and a value of "0" in a fourth position of the bit field may indicate that a fourth piece is not available for downloading from that participating peer. Continuing the same example, receiving only information from that participating peer, it may be impossible to determine whether a fourth piece exists and is not available, or weather it does not exists.

Therefore, the determining of stage 540 may include acquiring several participating peers for available pieces for downloading, and selecting the highest numbered positive piece as the pieces number estimation. It should be noted that the estimation may usually be updated at a later stage (even after caching several pieces), if additional information is received.

It should be noted that in many P2P networks, the participating peers may assume that the inquiry is valid and should be responded to, even if the system which carries out method 500 is not authenticated. It is further noted that one or more of the participating peers may inquire that system for its available pieces, in which a statement indicating that no pieces are available may be issued.

Stage 550 of method 500 includes evaluating piece size used in at least one of the payload files, wherein the evaluating includes requesting blocks of one or more of the pieces, and may be responsive to successes of a reception of the requested blocks. It is noted that in various embodiments of the invention, stages 540 and 500 may be carried out in various times in relation to one another.

It is noted that the participating peers, to which the information file is available, are expected to know (from the information file) the numbers of blocks in each of the pieces, as well as the size of which. Therefore, there is usually no protocol inquiry for the number of blocks. Also—each of the participating peers is expected to produce all the blocks of each of the pieces that it announce available (in networks in which binary piece availability information is provided).

Stage 550 may include requesting from one or more of the participating peers different blocks of one or more peers, and determining—in response to the blocks which are returned (and possibly also to error messages received from participating peers if blocks do not exist)—what is the numbers of the blocks in each of the pieces (wherein it is noted that the number of blocks in the last piece may be different, and therefore the piece assumed to be last may not be requested for). It is noted that usually a successful receiving of a single block should be sufficient for determining of a block size.

Some peer to peer protocols may require a requesting peer to store at least one data file block before requesting (or receiving) a data file block from another peer. Stage 550 can include transmitting an indicator about the caching of data file blocks in the cache module—even if these data file blocks are not cached—in order to receive data file blocks from participating peers.

According to an embodiment of the invention stage 550 includes: (i) requesting from participating peers their indicators (indicative of data file pieces stored in each participating peers), (ii) duplicating these indicators, (iii) sending to each participating peer a duplicate of its own indicator (thus providing a false indication that the cache module stores the data file pieces that are stored in the participating peer), the duplication may prevent the participating peer from requesting the cache module to provide data file blocks it does not cache), and (iv) obtain the data file blocks from the participating peers.

An indicator from a participating peer can include the exact amount of fields—corresponding to the actual number of data file pieces. This can be used to update the pieces number estimation.

It is noted that the information which is retrieved in stage 550 may be used for later caching—but the acquiring of payload data for caching may also be carried out independently.

Stage 560 of method 500 includes caching at least one piece of a payload file. The caching is usually carried out once the size of the at least one piece have been determined (so it can be known that the entire piece is available). It is noted that the cached data may be encrypted and/or encoded in a way which is not decodable by the caching system. According to an embodiment of the invention, the caching may include avoiding from caching information which may be used for caching (and thus making sure that the cached information is useless, without additional information which is not cached in the cache).

Method 500 may further include stage 570 of transmitting one or more of the cached pieces to another peer. It is noted that the transmitting may be carried out by a system other than the one which determines the pieces size and number. The transmitting may be implemented in different ways, according to different embodiments of the invention.

For example, the transmitting may include intercepting a transmission of payload data between peers, blocking a transmission by a transmitting peer, and instead providing cached information to a recipient peer. The transmitting may also include transmitting information when requested to—e.g. when operating as a peer.

This may be carried out, for example, following stage 580 of receiving a request for information from another peer. It is noted that such request may include information previously unknown (e.g. if being requested for a piece numbered higher than previously assumed legal), wherein updating of previously decided values may be carried out. Stage 580 may be followed by stage 575 of sending to the other peer an indicator about at least one data file piece that is cached in the cache module. The indicator is generated in response to the file pieces number estimation. The indicator can be a data structure that has multiple fields, each field relates to a data file piece and the number of fields can equal the file pieces number estimations. For example the indicator can be a bit map in which the value of each bit indicates whether a certain data file piece is cached or not. The requesting peer may expect to receive an indicator that has a predefined number of fields (equal the actual file pieces number) and may reject an indicator that has a different number of fields.

Stage 575 is followed by stage 570.

Stage 570 is followed by stage 590.

Following the transmission of the one or more cached pieces to the other peer, the other peer should receive the at least one transmitted piece, and/or recognize a problem with the transmission (generally denoted "peer receives piece" in FIG. 2). The receiving peer may request the same piece again (e.g. if the transmission was not successful), may request another piece, and may terminate the connection.

Stage 590 may be followed by stages 592, 594 or 596.

Stage 592 may include receiving from the other peer a request for at least one other piece.

Stage 594 may include receiving from the other peer a request for the same piece again.

Stage 596 may include managing a termination of connection with the other peer. It should be noted that such termination may result from a disconnecting by the peer, but may also happen in other situation—e.g. as result of communication lost, of determination by the transmitting unit, etc.

Figure 3:
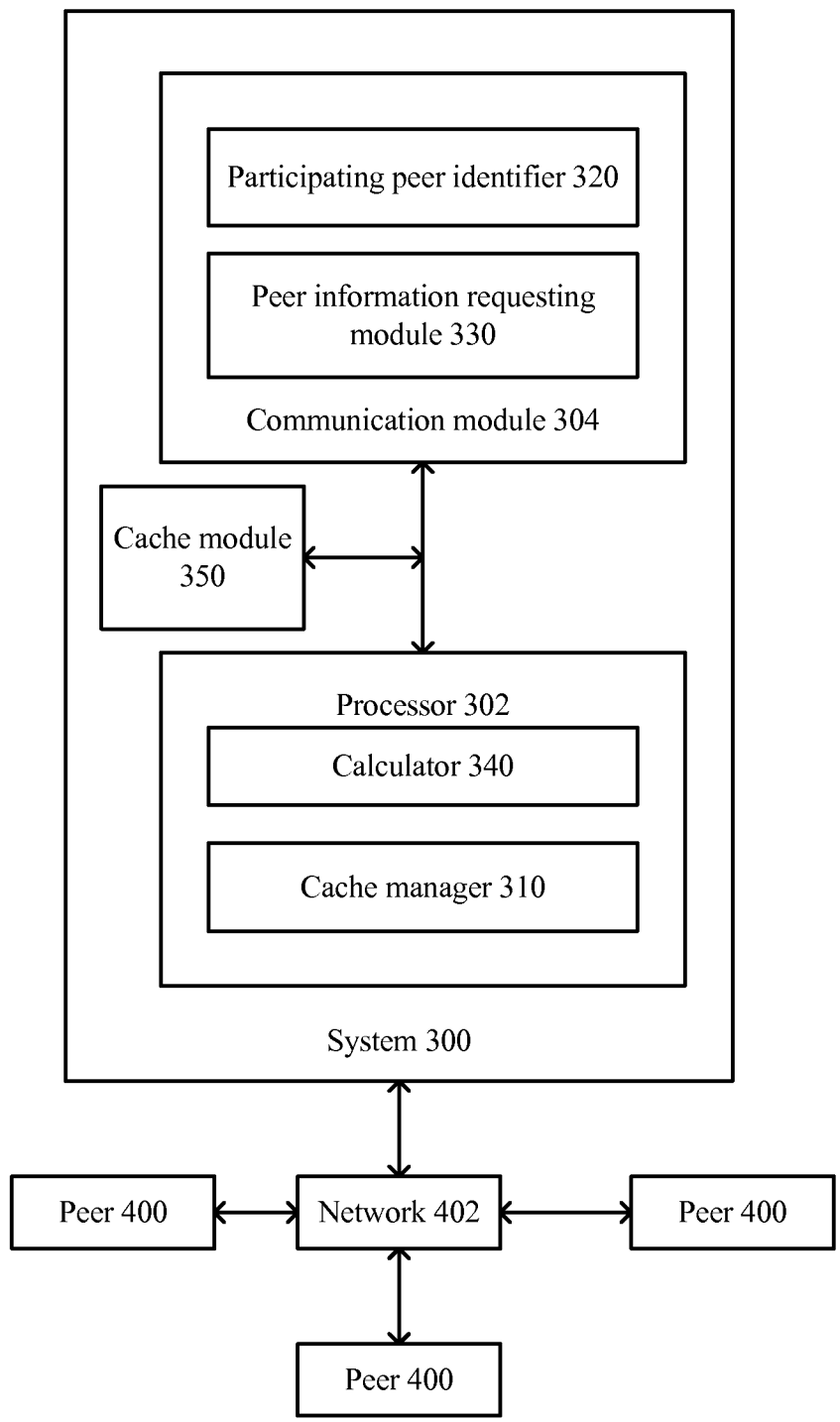
FIG. 3 illustrates a system according to an embodiment of the invention.

FIG. 3 illustrates a system 300 according to an embodiment of the invention.

The system can cache P2P transmitted information. It is noted that the system may implement, according to an embodiment of the invention, one or more of the aforementioned embodiments of method 500, even if not explicitly stated so. It is further more that the system may be implemented as multiple sub-systems, which may be located in different remote locations.

The system 300 may include a communication module 304 (that may include at least one network interface) for communicating with remote computers (peers) 400 over at least one network 402. It is noted that the remote computers 400 may be located in different rooms, buildings, cities, countries, and so forth. These peers (400) can include participating peers (that participate or are expected to participate) in a peer to peer transmission of a data file (or of a data file piece) and can include peers that do not participate in such communication. The latter can participate in a transmission (or expected transmission) of other data files (or other data file pieces).

The communication module 304 can be arranged to perform at least one of the following operations: (a) detect a transmission of an information file or a transmission of at least one data file piece, (b) transmit the certain data file piece; (c) receive a request to transmit the certain data file piece to a peer from another peer; terminate a peer to peer connection between the peer and the other peer and transmit the certain data file piece to the peer.

The system 300 may include a processor 302 for processing information received from the network, and for determining information to be sent to at least one of the remote computers.

The processor 302, when communicating over the at least one network interface, is configured to do some or all of the following:
  i. Identifying a transmission of information file that includes piece identifiers of pieces of at least one payload file
  ii. Determining to cache at least a portion of the at least one payload file
  iii. Identifying at least one participating peer that participates in a transfer of at least one piece of the pieces
  iv. Determining a pieces number estimation, wherein the determining of the pieces number estimation includes inquire at least one of the participating peers for available pieces, and may be responsive to the response of the at least one participating peers
  v. Evaluating piece size used in the at least one payload file, wherein the evaluating includes requesting blocks of one or more of the pieces, and may be responsive to successes of a reception of the requested blocks
  vi. Caching at least one piece of a payload file
  vii. Transmitting one or more of the cached pieces to another peer
  viii. Receiving a request for information from another peer According to an embodiment of the invention the system can include at least one of the following modules: (a) a cache manager 310, (b) a communication module 304, (c) (d) calculator 340, and (e) a cache module 350.

FIG. 3 illustrates the processor 302 as including the cache manager 310 and the calculator 340, but this is not necessarily so. At least one of these components can be implemented in a component other than processor 302.

The communication module 304 can include a participating peer identifier 320 and a peer information requesting module 330.

According to another embodiment of the invention the processor 302 may include modules 310, 320, 330 and 340.

The cache manager 310 can be arranged to determine to cache at least a certain data file piece of a data file that includes multiple data file pieces. Each data file piece has a unique data file piece number (data file piece identifier) that is indicative of an order of the data file piece in the data file. Data file piece numbers of all the multiple data file pieces of the data file can be stored in an information file such as.

The cache manager 310 may be arranged to: (a) cache the certain data file piece and at least one additional data file piece that belongs to the data file, and (b) retrieve the certain data file piece from the cache module.

The participating peer identifier 320 may be arranged to identify at least one participating peer that either (i) participates in an actual peer to peer transfer of a data file piece that belongs to the data file, and (ii) is expected to participate in an expected peer to peer transfer of a data file piece that belongs to the data file.

The peer information requesting module 330 may be arranged to request from the at least one participating peer, at least one of (i) a data file piece number of at least one data file piece that belongs to the data file and is associated with an actual or expected peer to peer transfer; (ii) at least a segment of at least one data file piece that is associated with an actual or expected peer to peer transfer.

The peer information requesting module 330 may be arranged to request from multiple participating peers segments of the certain data file piece and calculating the evaluated certain file piece size based on an amount of segments of the certain data file piece received from the multiple participating peers.

The calculator 340 may be arranged to calculate an evaluated certain file piece size and a file pieces number estimation based on at least one response of at least one participating peer.

The cache module 350 may be arranged to cache the certain data file piece in a cache module, wherein the caching may be responsive to at least one out of the evaluated certain data file piece size and the file pieces number estimation.

The calculator 340 may be arranged to calculate the evaluated certain file piece size and the file pieces number estimation, without using the information file.

The peer information requesting module 330 may be arranged to request from multiple participating peers data file piece numbers and to receive a plurality of data file piece numbers.

The calculator 340 may be arranged to receive the requested information, to find a highest value data file piece number of the plurality of data file piece numbers; and to set the file pieces number estimation as the highest value data file piece number.

System 300 can execute method 500, method 100, a combination thereof or a combination of any stages of these two methods.

Figure 4:
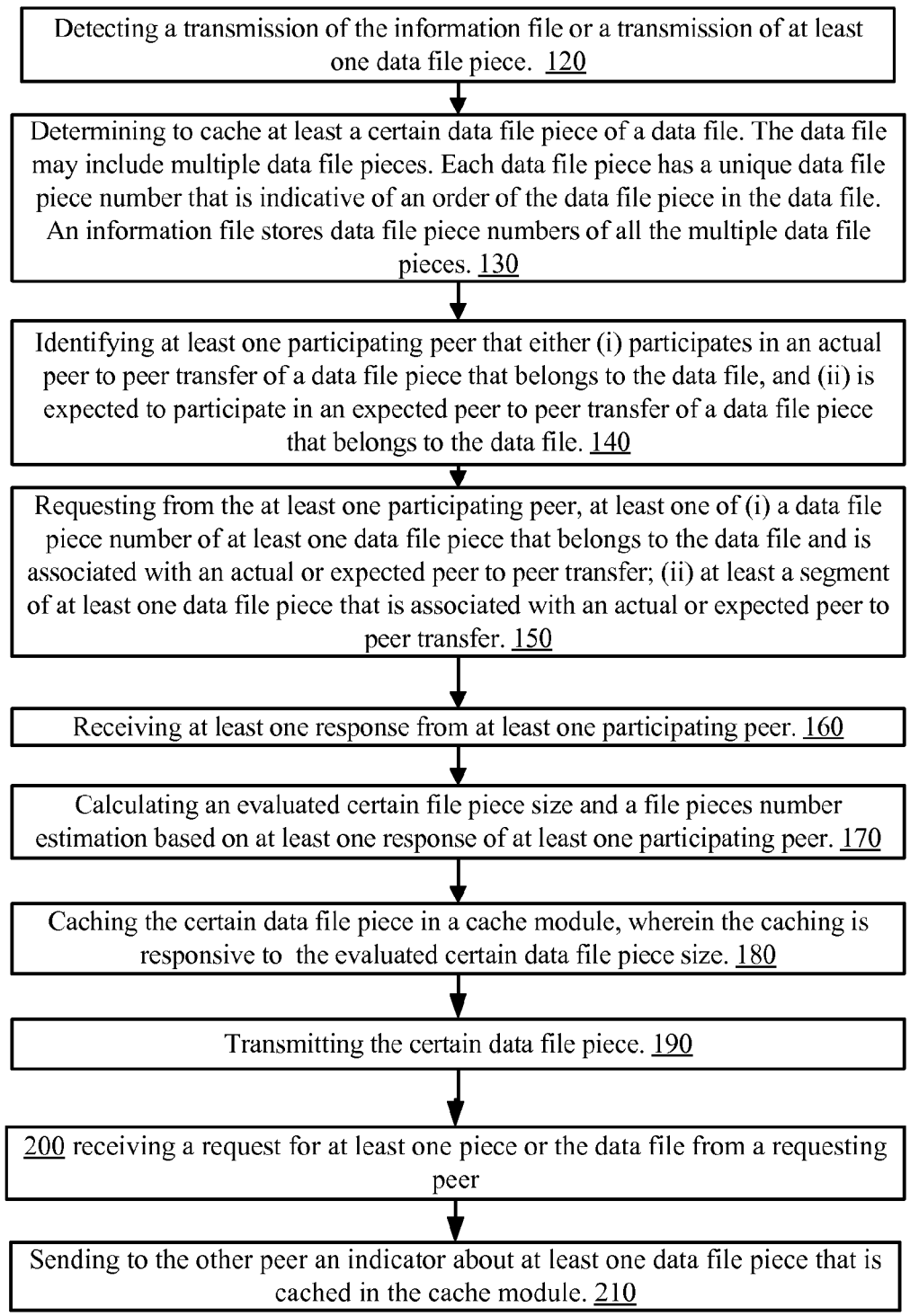
FIG. 4 illustrates a method according to an embodiment of the invention.

FIG. 4 illustrates method 100 for caching, according to an embodiment of the invention. Method 100 may include stages 120, 130, 140, 150, 160, 170, 180 and 190. These stages can be executed in a sequential manner, in a non-sequential manner, in an overlapping manner, in a partially overlapping manner, out-of order and the like.

Stage 120 includes detecting a transmission of the information file or a transmission of at least one data file piece. The detection can resemble (and even be the same as) the detection of stage 510.

Stage 130 includes determining to cache at least a certain data file piece of a data file. The data file may include multiple data file pieces. Each data file piece has a unique data file piece number that is indicative of an order of the data file piece in the data file. An information file stores data file piece numbers of all the multiple data file pieces. The determination can resemble (and even be the same as) the determination of stage 520.

Stage 140 includes identifying at least one participating peer that either (i) participates in an actual peer to peer transfer of a data file piece that belongs to the data file, and (ii) is expected to participate in an expected peer to peer transfer of a data file piece that belongs to the data file. The latter can be detected, for example, if metadata required for a future (expected) peer to peer transfer has been transferred over the peer to peer network or is made available to a peer (or peer manager).

Stage 150 includes requesting from the at least one participating peer, at least one of (i) a data file piece number of at least one data file piece that belongs to the data file and is associated with an actual or expected peer to peer transfer; (ii) at least a segment of at least one data file piece that is associated with an actual or expected peer to peer transfer. Such a request can resemble (or be the same as) the inquiring included in either one of stages 540 and 550.

Stage 160 includes receiving at least one response from at least one participating peer.

Stage 170 includes calculating an evaluated certain file piece size and a file pieces number estimation based on at least one response of at least one participating peer.

Such a calculation can resemble (or be the same as) the evaluating of stage 550 and the determining of stage 540.

Stage 180 includes caching the certain data file piece in a cache module, wherein the caching may be responsive to the evaluated certain data file piece size—thus the memory space required for storing the data file piece can be determined based on the evaluated certain data file piece size.

Such a caching can resemble (or be the same as) the cashing of stage 560.

Stage 180 can be executed without using the information file.

Stage 150 may include requesting from multiple participating peers data file piece numbers. Stage 160 may include receiving a plurality of data file piece numbers. Stage 170 may include finding a highest value data file piece number of the plurality of data file piece numbers and setting the file pieces number estimation as the highest value data file piece number. This sequence of stages can resemble (or even be the same as) stage 540.

Stage 180 can include caching more than the certain data file piece. At least one other data file piece of that data file can be stored. Even the entire data file can be stored.

Stage 150 may include requesting from multiple participating peers segments of the certain data file piece. Stage 180 may include calculating the evaluated certain file piece size based on an amount of segments of the certain data file piece received from the multiple participating peers. This sequence of stages can resemble (or even be the same as) stage 550.

Stage 180 may include updating the evaluated certain file piece size and the file pieces number estimation based on information obtained as a result of a transfer of another file piece.

Stage 190 may include transmitting the certain data file piece. This transmitting can resemble (or even be the same as) stage 570.

Stage 190 may include receiving a request to transmit the certain data file piece to a peer from another peer; terminating a peer to peer connection between the peer and the other peer; retrieving the certain data file piece from the cache module; and transmitting the certain data file piece to the peer. This sequence can resemble (or be the same as) stages 590, 592, 594 and 596.

Stage 190 can be followed by stage 200 of receiving a request for at least one piece or the data file from a requesting peer.

Stage 200 can be followed by stage 210 of sending to the other peer an indicator about at least one data file piece that is cached in the cache module. The indicator is generated in response to the file pieces number estimation. The indicator can be a data structure that has multiple fields, each field relates to a data file piece and the number of fields can equal the file pieces number estimations. For example the indicator can be a bit map in which the value of each bit indicates whether a certain data file piece is cached or not. The requesting peer may expect to receive an indicator that has a predefined number of fields (equal the actual file pieces number) and may reject an indicator that has a different number of fields.

According to an embodiment of the invention, one or more non-transient computer readable medium, having computer readable code embodied therein for caching P2P transmitted information is disclosed. It is noted that the non-transient computer readable medium may implement, according to an embodiment of the invention, one or more of the aforementioned embodiments of method 500, even if not explicitly stated so. It is further more that the non-transient computer readable medium may be implemented as multiple computer readable mediums, which may be located in different remote locations, and/or which may be executable by different processors.

The non-transient computer readable medium can store at least one of the following instructions:
  i. Identifying a transmission of information file that includes piece identifiers of pieces of at least one payload file.
  ii. Determining to cache at least a portion of the at least one payload file.
  iii. Identifying at least one participating peer that participates in a transfer of at least one piece of the pieces.
  iv. Determining a pieces number estimation, wherein the determining of the pieces number estimation includes inquire at least one of the participating peers for available pieces, and may be responsive to the response of the at least one participating peers.
  v. Evaluating piece size used in the at least one payload file, wherein the evaluating includes requesting blocks of one or more of the pieces, and may be responsive to successes of a reception of the requested blocks.
  vi. Caching at least one piece of a payload file.
  vii. Transmitting one or more of the cached pieces to another peer.
  viii. Receiving a request for information from another peer.

The non-transient computer readable medium can store at least one of the instructions of method 500 or method 100. For example it can store instructions for determining to cache at least a certain data file piece of a data file, the data file comprises multiple data file pieces; wherein each data file piece has a unique data file piece number that is indicative of an order of the data file piece in the data file; wherein an information file stores data file piece numbers of all the multiple data file pieces; identifying at least one participating peer that either (i) participates in an actual peer to peer transfer of a data file piece that belongs to the data file, and (ii) is expected to participate in an expected peer to peer transfer of a data file piece that belongs to the data file; requesting from the at least one participating peer, at least one of (i) a data file piece number of at least one data file piece that belongs to the data file and is associated with an actual or expected peer to peer transfer; (ii) at least a segment of at least one data file piece that is associated with an actual or expected peer to peer transfer; calculating an evaluated certain file piece size and a file pieces number estimation based on at least one response of at least one participating peer; caching the certain data file piece in a cache module, wherein the caching may be responsive to the evaluated certain data file piece size.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for caching, the method comprises:
  determining to cache at least a certain data file piece of a data file, the data file comprises multiple data file pieces; wherein each data file piece has a unique data file piece number that is indicative of an order of the data file piece in the data file; wherein an information file stores data file piece numbers of all the multiple data file pieces;
  identifying at least one participating peer that either (i) participates in an actual peer to peer transfer of a data file piece that belongs to the data file, and (ii) is expected to participate in an expected peer to peer transfer of a data file piece that belongs to the data file;
  requesting from the at least one participating peer, at least one of (i) a data file piece number of at least one data file piece that belongs to the data file and is associated with an actual or expected peer to peer transfer; (ii) at least a segment of at least one data file piece that is associated with an actual or expected peer to peer transfer;
  calculating an evaluated certain file piece size and a file pieces number estimation based on at least one response of at least one participating peer; and
  caching the certain data file piece in a cache module; wherein the caching is responsive the evaluated certain data file piece size.

2. The method according to claim 1, comprising receiving a request for a data file from a requesting peer and sending to the requesting peer an indicator about at least one data file piece that is cached in the cache module; wherein the indicator is generated in response to the file pieces number estimation.

3. The method according to claim 1, comprising calculating the evaluated certain file piece size and the file pieces number estimation, without using the information file.

4. The method according to claim 1, comprising:
  requesting from multiple participating peers data file piece numbers;
  receiving a plurality of data file piece numbers;
  finding a highest value data file piece number of the plurality of data file piece numbers; and
  setting the file pieces number estimation as the highest value data file piece number.

5. The method according to claim 1, comprising caching the certain data file piece and at least one additional data file piece that belongs to the data file.

6. The method according to claim 1, wherein the determining to cache at least the certain data file piece is preceded by detecting a transmission of the information file or a transmission of at least one data file piece.

7. The method according to claim 1, comprising requesting from multiple participating peers segments of the certain data file piece and calculating the evaluated certain file piece size based on an amount of segments of the certain data file piece received from the multiple participating peers.

8. The method according to claim 1, further comprising updating the evaluated certain file piece size and the file pieces number estimation based on information obtained as a result of a transfer of another file piece.

9. The method according to claim 1, further comprising transmitting the certain data file piece.

10. The method according to claim 1, further comprising receiving a request to transmit the certain data file piece to a peer from another peer; terminating a peer to peer connection between the peer and the other peer; retrieving the certain data file piece from the cache module; and transmitting the certain data file piece to the peer.

11. A non-transient computer readable medium that stores instructions for:
  determining to cache at least a certain data file piece of a data file, the data file comprises multiple data file pieces; wherein each data file piece has a unique data file piece number that is indicative of an order of the data file piece in the data file; wherein an information file stores data file piece numbers of all the multiple data file pieces;
  identifying at least one participating peer that either (i) participates in an actual peer to peer transfer of a data file piece that belongs to the data file, and (ii) is expected to participate in an expected peer to peer transfer of a data file piece that belongs to the data file;

requesting from the at least one participating peer, at least one of (i) a data file piece number of at least one data file piece that belongs to the data file and is associated with an actual or expected peer to peer transfer; (ii) at least a segment of at least one data file piece that is associated with an actual or expected peer to peer transfer;

calculating an evaluated certain file piece size and a file pieces number estimation based on at least one response of at least one participating peer; and caching the certain data file piece in a cache module, wherein the caching is responsive to the evaluated certain data file piece size.

12. The non-transient computer readable medium according to claim 11, that stores instructions for sending to a requesting peer an indicator about at least one data file piece that is cached in the cache module; wherein the indicator is generated in response to the file pieces number estimation.

13. The non-transient computer readable medium according to claim 11, that stores instructions for calculating the evaluated certain file piece size and the file pieces number estimation, without using the information file.

14. The non-transient computer readable medium according to claim 11, that stores instructions for:

requesting from multiple participating peers data file piece numbers;

receiving a plurality of data file piece numbers;

finding a highest value data file piece number of the plurality of data file piece numbers; and setting the file pieces number estimation as the highest value data file piece number.

15. The non-transient computer readable medium according to claim 11, that stores instructions for caching the certain data file piece and at least one additional data file piece that belongs to the data file.

16. The non-transient computer readable medium according to claim 11, that stores instructions for detecting a transmission of the information file or a transmission of at least one data file piece.

17. The non-transient computer readable medium according to claim 11, that stores instructions for requesting from multiple participating peers segments of the certain data file piece and calculating the evaluated certain file piece size based on an amount of segments of the certain data file piece received from the multiple participating peers.

18. The non-transient computer readable medium according to claim 11, that stores instructions for updating the evaluated certain file piece size and the file pieces number estimation based on information obtained as a result of a transfer of another file piece.

19. The non-transient computer readable medium according to claim 11 that stores instructions for transmitting the certain data file piece.

20. The non-transient computer readable medium according to claim 11 that stores instructions for receiving a request to transmit the certain data file piece to a peer from another peer; terminating a peer to peer connection between the peer and the other peer; retrieving the certain data file piece from the cache module; and transmitting the certain data file piece to the peer.

\* \* \* \* \*